United States Patent [19]
Tachibana et al.

[11] Patent Number: 5,410,006
[45] Date of Patent: Apr. 25, 1995

[54] COMPOSITION FOR FORMING LENS, AND FRESNEL LENS AND TRANSMISSION SCREEN USING SAID COMPOSITION

[75] Inventors: Kazuhiro Tachibana; Katsunori Takahashi, both of Tokyo, Japan

[73] Assignee: Dai Nippon Printing Co., Ltd., Tokyo, Japan

[21] Appl. No.: 920,293

[22] PCT Filed: Dec. 16, 1991

[86] PCT No.: PCT/JP91/01717
§ 371 Date: Aug. 14, 1992
§ 102(e) Date: Aug. 14, 1992

[87] PCT Pub. No.: WO92/11320
PCT Pub. Date: Jul. 9, 1992

[30] Foreign Application Priority Data
Dec. 17, 1990 [JP] Japan .................. 2-402741

[51] Int. Cl.$^6$ .............. C08F 18/00; C08F 20/00; G02B 3/08
[52] U.S. Cl. ................. 526/292.6; 526/301; 428/424.4; 428/424.6; 359/742
[58] Field of Search .............. 526/301, 292.6; 428/424.4, 424.6; 359/742

[56] References Cited
U.S. PATENT DOCUMENTS
4,487,904 12/1984 Fukuda et al. ............. 526/301

Primary Examiner—Paul R. Michl
Assistant Examiner—Lavonda Dewitt
Attorney, Agent, or Firm—Dellett and Walters

[57] ABSTRACT

The invention discloses a composition for forming lens, which contains urethane acrylate prepolymer based on tolylenediisocyanate as a principal material, and further said composition containing brome acrylate at least by 10 to 40 weight %, caprolactone denatured hydroxypivalic acid ester neopentylglycoldiacrylate by 3 to 20 weight %, and bis-(acryloxyethoxy)bisphenol A by 3 to 60 weight %, and refractive index of said cured product being 1.5 or more, further discloses a Fresnel lens using said composition, and a transmission screen 1, in which a Fresnel lens 3 is formed on a base material 2.

10 Claims, 3 Drawing Sheets

COMPOSITION FOR FORMING LENS, AND FRESNEL LENS AND TRANSMISSION SCREEN USING SAID COMPOSITION

FIELD OF THE INVENTION

The present invention relates to a composition for forming a lens and to a Fresnel lens and a transmission screen of rear projection type using said composition, and in particular to a transmission screen having a Fresnel lens of short focal length.

BACKGROUND ART

For a transmission screen to be used in microfilm reader, projection television, etc., attempts are made to increase light diffusion property of the screen. For this purpose, a lenticular lens, Fresnel lens, etc. are provided on light source side, and a light shielding layer is furnished on observer side to enhance screen contrast, and a light diffusion substance is added on the screen to increase light diffusion property of the screen.

Conventionally, to form such transmission screen, a synthetic resin sheet is produced by extrusion molding method, press molding method or casting method, and this is laminated with film of base material, and a lenticular lens or a Fresnel lens is formed directly on the film.

In the transmission screen, a Fresnel lens is arranged between various types of light sources such as cathode ray tube, liquid crystal filter type projection system on one side and a lenticular lens sheet on the other side, and light beam from the light source entering at high angle toward the surrounding region of the screen is converged slightly inwardly to prevent the darkening of the surrounding regions of the screen due to divergence of light from the light source.

When light beam enters Fresnel lens, refractive angle of the beam is determined according to the material of the Fresnel lens. The higher refractive index the material has, the less the light beam is lost even when the beam is refracted at high angle. Thus, if a material with higher refractive index is used for Fresnel lens, it is possible to refract light beam entering at high incident angle with less reflecting loss. As the result, it is possible to bring the position of the light source much closer to the screen and to shorten the distance between the light source of projection television and the screen. This contributes to designing of the projection television in smaller size.

Then, it is necessary to use a lens of short focal length as the Fresnel lens in order to shorten the distance between the light source of an image and the transmission screen. For this purpose, instead of methyl metacrylate resin with high transparency (refractive index $n=1.49$), a material of higher refractive index such as styrene is copolymerized with methyl metacrylate, and a sheet of the resultant material (e.g. having refractive index $n=1.57$) is used for the purpose by molding through thermal pressing.

However, the productivity of such Fresnel lens is not very high because it is produced by a series of processes including heating, pressurizing and cooling. In particular, to mold a Fresnel lens having fine lens shape over a large area by thermal pressing, it is necessary to heat under strict temperature condition and to perform pressurizing and cooling for long time, and this leads to very low production efficiency.

Under such circumstances, it has been proposed to utilize a UV-setting resin, which is cured by ionizing radiation such as ultraviolet ray within short time, instead of thermosetting resin as conventionally used in order to improve production efficiency and to form lenses with fine shape.

The UV-setting resin has a prepolymer of UV-setting resin as its material. The prepolymer of UV-setting resin is a macromolecular substance with low polymerization degree and high viscosity, and it is not possible to coat it on or to fill into a die. For this reason, it is necessary to use a diluent to dissolve the prepolymer. If an organic solvent is used as the diluent, the molded object is deformed due to evaporation of the organic solvent, and it is practiced to use a monomer as the diluent to polymerize with the prepolymer.

For a composition of UV-setting resin to be used in Fresnel lens or transmission screen using such lens must have, along with transparency of cured resin, high toughness not easily susceptible to rubbing as well as adequate surface hardness against deformation. As UV-setting resin usable for such purpose, there is urethane type acrylate resin. In order that the resin cured by ultraviolet ray maintains high refractive index, various types of acrylate resin effective to improve density of the resin are used in the monomer serving as diluent. However, the refractive index of a composition containing acrylate is not very satisfactory when compared with a material for thermal molding, in which a material with high refractive index such as styrene and methyl metacrylate are polymerized.

Also, in a two-sheet type transmission screen, it is practiced to combine a sheet where a Fresnel lens is formed with a sheet where a lenticular lens is formed, and further to transport the combined sheet and to incorporate it in the equipment for projection television. However, there is a problem that Fresnel lens surface is brought into contact with and damaged by surface of the other lens sheet due to vibration during transportation. In the past, such damage has been prevented by placing a buffer sheet between lens sheets or by adding a lubricant such as silicon oil. However, when the buffer sheet is placed, it is necessary to remove the buffer sheet by taking away the Fresnel lens sheet and the lenticular lens sheet. When lubricant such as silicone oil is used, the cost is increased and the resultant image becomes uneven due to uneven application of lubricant.

With the circumstances as such, there have been strong demands on a composition of UV-setting resin for transmission screen, which is made of a resin, having high refractive index, high transparency of cured resin, and high toughness against damage caused by rubbing.

DISCLOSURE OF THE INVENTION

The composition for forming a lens according to the present invention comprises a composition of UV-setting resin and uses urethane acrylate prepolymer based on tolylenediisocyanate (TDI) given by the formula (1) below as a urethane type acrylate resin which is characterized by colorlessness, transparency and flexibility as a prepolymer of UV-setting resin and by low-vulnerability to damages caused by rubbing of the screen, further using 2-functional acrylate having benzene ring such as bis(acryloxyethoxy)bisphenol A given by the formula (2) as a reactive diluent, and brome acrylate is added to increase refractive index. Further, to improve flexibility and increase anti-friction property, caprolactone denatured hydroxypivalic acid ester neopentyldiacrylate is added. As the result, a Fresnel lens can be

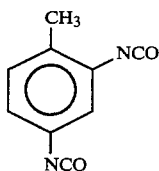

Formula (1)

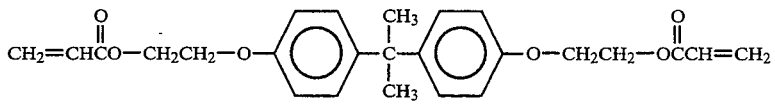

Formula (2)

However, the urethane type UV-setting resin primarily based on isophoronediisocyanate does not have sufficient refractive index. In contrast, tolylenediisocyanate to be used as a composition for forming lens of the present invention has a benzene ring unlike isophoronediisocyanate which has a 6-member ring. For this reason, it can provide a resin of higher density compared with isophoronediisocyanate and contributes to the improvement of refractive index.

To obtain urethane acrylate type prepolymer to be used in a composition for forming lens of the present invention, tolylene-diisocyanate is brought into reaction with polyol components such as polyether polyol, polyester polyol, etc., and a prepolymer having acrylate at the terminal is used. It is contained in the composition of the present invention by 10–60 weight %.

Caprolactone denatured hydroxypivalic acid ester neopentylglycoldiacrylate is a 2-functional acrylate, which is produced by esterizing hydroxypivalic acid ester neopentylglycol with caprolactonediol to have a longer straight chain in the skeleton, and flexibility is increased by lowering density of functional group. This diacrylate is contained by 3 to 40 weight %. When the content of this diacrylate is lower than 3 weight %, sufficient flexibility cannot be obtained. If it is more than 20 weight %, refractive index is decreased.

As the caprolactone degenerated hydroxypivalic acid ester neopentylglycoldiacrylate to be used in the present invention, HX-220 (trade name) manufactured by Nippon Kayaku Co., Ltd. may be used.

As the monomer to be used as a reactive diluent for the prepolymer of urethane type acrylate, it is necessary to use the one, which maintains high refractive index when curing. From such viewpoint, 2-functional diacrylate of bisphenol A having a benzene ring on main chain is used.

Bisphenol A type diacrylate is contained by 3 to 60 weight %. When the content of bisphenol A type diacrylate is lower than 3 weight %, dilution property is not sufficient. If it is more than 60 weight %, moldability is worsened by excessive fluidity of the resin due to lower viscosity when the cured resin is molded.

To merely increase the density, it is preferable to use mono-functional epoxyacrylate. However, the molded product of mono-functional epoxy acrylate becomes too hard after curing and it adheres well to the other substances. Thus, when the IV-setting resin composition thus obtained is applied to or filled into a die for manufacturing Fresnel lens, it adheres too tightly to the die, and it is difficult to separate it from the die. In contrast, in case of multi-functional acrylate, cured resin is softer and does not easily adhere to the die. Thus, it can be used as a reactive diluent with high refractive index and good mold releasing property.

BEST MODE FOR CARRYING OUT THE INVENTION

Figure 1:
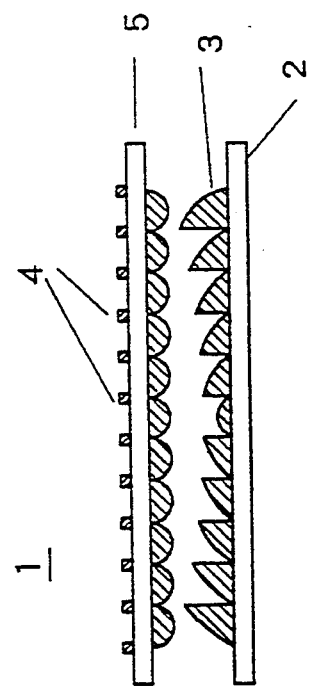
FIG. 1 shows a transmission screen having a Fresnel lens, which is formed on a base material of synthetic resin, using a composition for forming lens of the present invention.

Giving an example of brome acrylate usable in the present invention, acrylate such as ethyleneoxide addition product of tetrabromobisphenol A is used in addition to tribromophenol methacrylate such as 1-methylacrylate-2,4,6-tribromophenol given by the following formula (3). Brome acrylate is contained in the composition by 10 to 40 weight %.

The more the brome acrylate is added, the higher refractive index the Fresnel lens has. However, the maximum content of brome acrylate is 40 weight %, because it is in solid state at normal temperature and dissolved in the composition is limited. Also, it must be contained by more than 10 weight % because it is difficult to obtain sufficient refractive index if it is contained by less than 10 weight %.

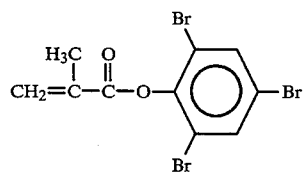

Formula (3)

As the urethane type acrylate, there is urethane type acrylate prepolymer based on isophoronediisocyanate (IPDI), given by the formula (4) below, in addition to urethane acrylate based on tolylenediisocyanate. When IPDI is used as prepolymer, cured resin has good flexibility and toughness.

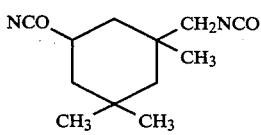

Formula (4)

Bis-(acryloxyethoxy)-bisphenol A is a diacrylate, which can be obtained by adding acrylic acid to hydroxyl group at the end of ethyleneoxide or propyleneoxide addition product of bisphenol A, and added molar number of ethyleneoxide or propyleneoxide gives influence on flexibility and refractive index of the cured resin. In other words, long chain of ethyleneoxide or polypropyleneoxide contained in main chain of the polymer improves flexibility of the cured product, while the number of benzene rings in the cured product is decreased, and the refractive index is lowered.

According to the present invention, it is possible to keep good balance of flexibility and high refractive index by simultaneously using bis-(acryloxyethoxy)-bisphenol A with ethyleneoxide with smaller added molar number and the one with higher added molar number. For this purpose, it is preferable to contain the former by 1.5 to 30 weight %, and the latter by 1.5 to 30 weight %.

As the bis-(acryloxyethoxy)-bisphenol A to be used in the present invention, FM-300 (trade name) manufactured by Nippon Kayaku Co., Ltd. as the one with ethyleneoxide with smaller added molar number, and BR-800 (trade name) manufactured by Nippon Kayaku Co., Ltd. as the one with higher added molar number.

In the present invention, as a reactive diluent, mono-functional urethane acrylate monomer having hydroxyl group and benzene ring may be contained by 3 to 20 weight %. The mono-functional acrylate increases flexibility of the cured product and contributes to the improvement of refractive index. As mono-functional urethane acrylate monomer to be used in the present invention, OPP-2 (trade name) manufactured by Nippon Kayaku Co., Ltd. may be used.

Further, it is preferable that the above composition containing pentaerythritol type 4-functional monomer by 1 to 4 weight % is used as the composition for forming lens of the present invention. Pentaerythritol type 4-functional monomer contributes to crosslinking when curing and increases elasticity of the cured product. When the content of pentaerythritol type 4-functional monomer is lower than 1 weight %, sufficient elasticity is not obtained. If it is contained by more than 4 weight %, cured product becomes too hard due to excessive crosslinking.

As pentaerythritol type 4-functional monomer to be used in the present invention, RP-1040 (trade name) manufactured by Nippon Kayaku Co., Ltd. may be used.

As the reactive diluent, a substance other than bis-(acryloxyethoxy)-bisphenol A may be added to the above composition in such quantity as not to affect the other physical property. For example, a monomer such as phenoxyethylacrylate may be added.

The composition for forming lens according to the present invention contains urethane acrylate based on tolylenediisocyanate as principal component. Accordingly, a number of benzene rings are contained in the polymer, i.e. cured product, and the cured product may be turned to yellowish due to oxidation of benzene rings. Therefore, it is preferable to add amine type additive to the composition of the present invention by 0.3 to 2 weight %. Amine type additive can stabilize double bonding in benzene rings by its reduction effect and improve weatherproof property.

As the amine type additive to be used in the present invention, IM-820 (trade name) manufactured by Nippon Kayaku Co., Ltd. may be used.

In the composition for forming lens according to the present invention, compositions are blended so that the refractive index after curing becomes 1.5 or more. When refractive index of the cured product is lower than 1.5, the prepared Fresnel lens sheet does not provide a lens with sufficiently short focal length.

The composition for forming lens according to the present invention can be cured by irradiation of ultraviolet ray or ionizing radiation such as electron beam. When it is cured by ultraviolet ray, photopolymerization initiator such as sensitizer is added. As the photopolymerization initiator, acetophenones, benzophenones, thioxanthones, amines, etc. can be used. For example, Dalocure 1173, Dalocure 1116, Dalocure 953 (Merck), Bycure 55 (Stoffer), Ilgacure 184, Ilgacure 500, Ilgacure 651 (Ciba Geigy) may be used. To the composition of the present invention, light diffusing agent, antistatic agent, coloring agent, surface active agent, flame retardant, mold releasing agent, slipping agent, defoaming agent, softening agent, etc. can be added.

FIG. 1 shows a transmission screen having a Fresnel lens formed by the composition for forming lens according to the present invention. In a transmission screen 1, a Fresnel lens formed on a base material 2 of synthetic resin is combined with a lenticular lens sheet 5. In the transmission screen of the present invention, Fresnel lens is arranged on light source side to prevent darkening of the screen due to divergence of light in the surrounding region.

Figure 2A:
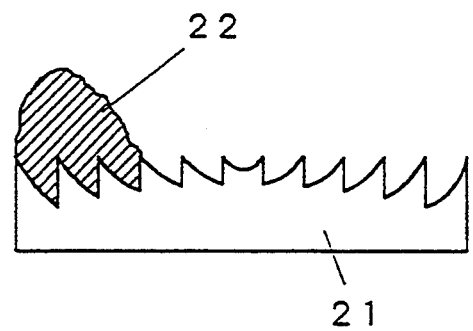
FIGS. 2(a)–2(c) represent drawings for explaining a method for manufacturing a lens using a composition for forming lens of the present invention.
Figure 2B:
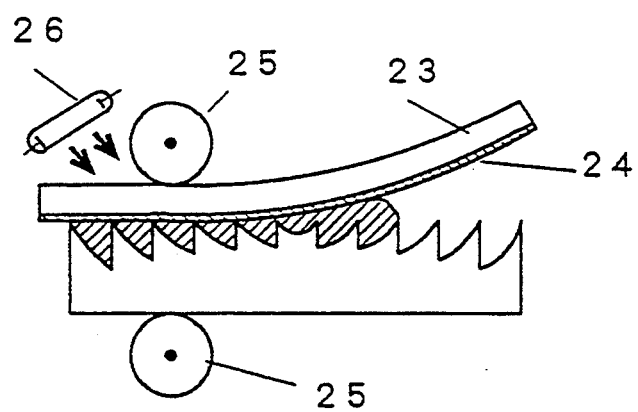
Figure 2C:
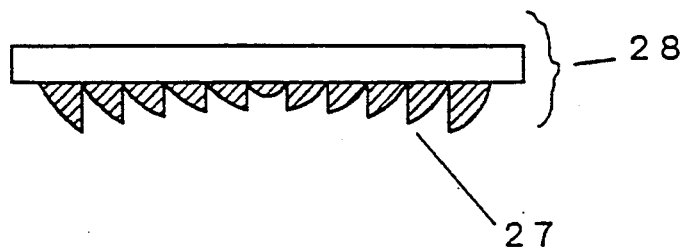
Figure 3:
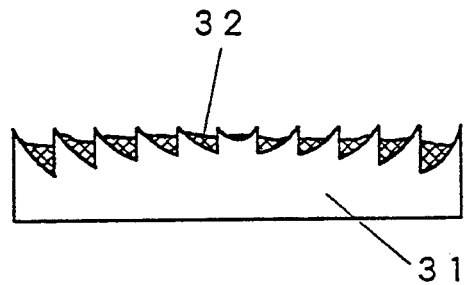
FIGS. 3(a)–3(d) show drawings for explaining another method for manufacturing a lens using a composition for forming lens of the present invention.
Figure 3:
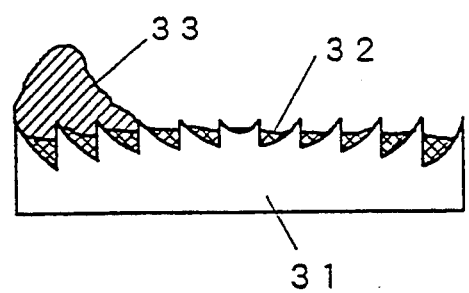
Figure 3:
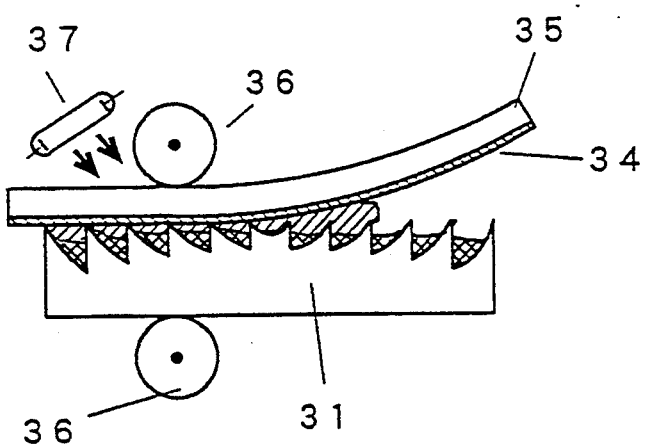
Figure 3:
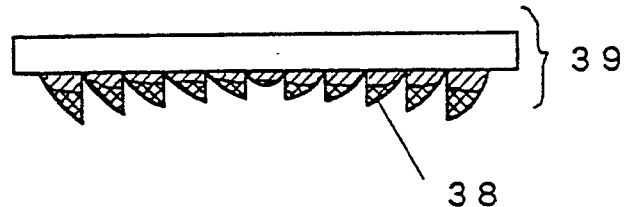

FIGS. 2(a)–2(c) show cross-sectional views of an embodiment for manufacturing a lens using the composition for forming lens according to the present invention. As shown in FIG. 2 (a), the composition for forming lens was placed on one end of a lens forming mold 21 by squeezing method, flow coating method or roll coating method to build up a resin pool 22 of the composition. Then, as shown in FIG. 2 (b), a base material 23 for a transparent lens sheet, which a primer layer 24 was formed, laminated on the lens forming mold 21 with the resin pool 22 of the composition. From the region where the resin pool was furnished, a pressure roll 25 was rolled over and was pressed on the base material, pushing air bubbles out. At the same time as pressurizing, ultraviolet ray was irradiated from a ultraviolet ray source 26, and the composition for forming lens was cured. After curing, as shown in FIG. 2 (c), the mold was separated, and a Fresnel lens sheet 28 with a Fresnel lens 27 formed on it was prepared. The Fresnel lens sheet thus prepared did not contain air bubbles in its lens unit.

As the base material for the lens sheet, transparent synthetic resin sheet, film, etc. such as polymethylmethacrylate, polystyrene, polycarbonate, etc. may be used. As the primer layer, a material having good adhesive property to both the base material for lens sheet and the composition for forming lens according to the present invention may be used. For example, vinyl chloride-vinyl acetate copolymer type primer, butyral type primer, urethane type primer, phenoxy type primer, etc. may be used.

FIGS. 3(a)–(d) represent another method for manufacturing a lens using the composition for forming lens according to the present invention. As shown in FIG. 3 (a), the composition for forming lens was diluted by a solvent to decrease viscosity, and it was used to form a first resin layer 32 on a mold 31 by silk screen method. Then, organic solvent was evaporated, and a resin pool 33 of the composition for forming lens was furnished on the first resin layer at one end of the mold. Then, as shown in FIG. 3 (c), a base material 35 consisting of transparent acrylate resin, on which a primer layer 34 consisting of vinyl chloride-vinyl acetate copolymer was formed, was laminated. From the region where the resin pool was furnished, a pressure roll 36 was rolled over and it was pressed on the base material, pushing air bubbles out. At the same time as pressurizing, ultraviolet ray was irradiated from an ultraviolet ray source 37 to harden the composition for forming lens. As shown in FIG. 3 (d), the mold was separated, and a lens sheet 39 having a Fresnel lens 38 was obtained. The Fresnel lens prepared by this manufacturing method has good form reproducibility and is advantageous in that less air bubbles are intermingled than the method described above.

The composition for forming lens according to the present invention has UV-setting prepolymer based on tolylenediisocyanate as main material. It is a UV-setting resin composition containing brome acrylate at least by 10 to 40 weight %, caprolactone degenerated hydroxypivalic acid ester neopentylglycoldiacrylate by 3 to 20 weight %, and bis-(acryloxyethoxy)-bisphenol A by 3 to 60 weight %. The resin obtained by curing through ultraviolet ray is colorless and transparent, has flexibility and is not vulnerable to rubbing, and has high refractive index. If this composition is used in Fresnel lens, it is possible to obtain a Fresnel lens with short focal length.

In the following, description will be given on some examples:

(EXAMPLE 1)

On a die, a UV-setting resin composition was coated, which had been prepared by mixing UV-setting prepolymer based on tolylenediisocyanate (Iu011(s); Nippon Kayaku Co., ltd.) by 25 weight %, bis-(acryloxyethoxy)-bisphenol A (FM-300; Nippon Kayaku Co., Ltd.) by 50 weight %, and 1-methylacrylate-2,4,6-tribromophenol by 25 weight %.

On the layer of the UV-setting resin, a sheet of acryl resin (Sumipex HT; Sumitomo Chemical Industry Co., ltd.) of 3 mm in thickness was pressed and laminated so that air bubbles are not intermingled. From the direction of acryl resin sheet, ultraviolet ray was irradiated for 20 seconds from a high voltage mercury lamp, and the UV-setting resin composition was cured.

When refractive index of the lens thus prepared was measured by Abbe refractometer, it was 1.57 and was equal to the refractive index 1.57 of the material, which was prepared through copolymerization of styrene and polymethylmethacrylate.

(EXAMPLE 2)

The composition for forming lens primarily based on urethane acrylate prepolymer was coated on a chromium-plated die of Fresnel lens, using a dispenser. An acryl plate (Sumipex HT; Sumitomo Chemical Industry Co., Ltd.) of 3 mm in thickness where a primer layer made of vinyl chloride-vinyl acetatecopolymer (VAGH (trade name); Union Carbide:) was pressed and laminated on the resin filled in the above die so that the air is not intermingled. Ultraviolet ray was irradiated for 30 seconds using high voltage mercury lamp to cure the composition for forming lens. Then, the die was separated, and a Fresnel lens sheet was prepared.

The lens thus prepared had refractive index of 1.55.

| [Chemical composition of the composition for forming lens] | |
|---|---|
| Urethane acrylate prepolymer (trade name TU03; Nippon Kayaku Co., Ltd.) based on tolylenediisocyanate | 37.0 weight % |
| Mono-functional urethane acrylate monomer (trade name OPP-2; Nippon Kayaku Co., Ltd.) Bis-(acryloxyethoxy)-bisphenol A (Nippon Kayaku Co., Ltd.) | 9.0 weight % |
| FM-300 (trade name) | 10.0 weight % |
| BR-800 (trade name) | 10.0 weight % |
| Brome acrylate (Nippon Kayaku Co., Ltd.) BR-100 (trade name) | 20.0 weight % |
| Pentaerythritol type 4-functional monomer (trade name RP-1040; Nippon Kayaku Co., Ltd.) | 2.0 weight % |
| Caprolactone denatured pivalic acid ester neopentylglycoldiacrylate (trade name HX-220; Nippon Kayaku Co., Ltd.) | 10.0 weight % |
| 1-hydroxycyclophenoxylphenylketone (trade name Ilgacure 184; Ciba Geigy) | 0.7 weight % |
| Amine type additive (trade name IM-820; Nippon Kayaku Co., Ltd.) | 1.0 weight % |
| Fluorine type surface active agent (trade name Florade FC-430; Sumitomo 3M Co., Ltd.) | 0.3 weight % |

INDUSTRIAL APPLICABILITY

The resin prepared by curing the composition for forming lens according to the present invention by ultraviolet ray is colorless and transparent, has flexibility and is not vulnerable to rubbing and has high refractive index. Accordingly, when a Fresnel lens is manufactured from this resin, it is possible to obtain a lens with shorter focal length. When a transmission screen having the Fresnel lens between a light source and a lenticular lens is used for a projection television, it is possible to shorten the distance between the light source and the transmission screen because it has short focal length. This contributes to compact design of the system.

What we claim is:

1. A transmission screen, in which a Fresnel lens is laminated with a base material, said Fresnel lens being formed by a composition for forming lens, containing UV-setting prepolymer based on tolylenediisocyanate as principal material, and further containing brome acrylate by 10 to 40 weight %.

2. A transmission screen, in which a Fresnel lens is laminated on a base material, said Fresnel lens being formed by a composition for forming a lens according to claim 1, wherein said composition further comprises caprolactone denatured hydroxypivalic acid ester neopentylglycoldiacrylate by 3 to 20 weight %.

3. A transmission screen, in which a Fresnel lens is laminated on a base material, said Fresnel lens being formed by a composition for forming a lens according to claim 1 or 2, wherein said composition further comprises a reactive diluent of bis(acryloxyethoxy)-bisphenol A by 3 to 60 weight %.

4. A transmission screen, in which a Fresnel lens is laminated on a base material, said Fresnel lens being formed by a composition for forming a lens according to claim 1, wherein said composition further comprises pentaerythritol 4-functional monomer by 1 to 4 weight %.

5. A transmission screen, in which a Fresnel lens is laminated on a base material, said Fresnel lens being formed by a composition for forming a lens according to claim 2, wherein said composition further comprises pentaerythritol 4-functional monomer by 1 to 4 weight %.

6. A transmission screen, in which a Fresnel lens is laminated on a base material, said Fresnel lens being formed by a composition for forming a lens according to claim 3, wherein said composition further comprises pentaerythritol 4-functional monomer by 1 to 4 weight %.

7. A method of forming a transmission screen, in which a Fresnel lens is laminated on a base material, said Fresnel lens being formed by the steps of:

providing a UV-setting prepolymer resin composition based upon tolylenediisocyanate, which contains a brome acrylate compound of 10 to 40 weight % and a reactive diluent of 3 to 60 weight %, supplying said resin composition to a lens forming mold, and curing said resin composition in the mold by UV irradiation.

8. A method of forming a transmission screen according to claim 7, wherein the reactive diluent provided is bis-(acryloxyethoxy)-bisphenol A.

9. A method of forming a transmission screen according to any one of claims 7 to 8 further comprising providing said resin composition with caprolactone denatured hydroxypivalic acid ester neopentylglycoldiacrylate of 3 to 20 weight %.

10. A method of forming a transmission screen according to claim 9 further comprising providing said resin composition with pentaerythritol 4-functional monomer of 1 to 4 weight %.

* * * * *